US 9,885,734 B2

(12) United States Patent
Liou et al.

(10) Patent No.: US 9,885,734 B2
(45) Date of Patent: Feb. 6, 2018

(54) METHOD OF MOTION PROCESSING AND RELATED MOBILE DEVICE AND MICROCONTROLLER UNIT

(71) Applicant: CM HK LIMITED, Fortress Hill (HK)

(72) Inventors: Shun-Nan Liou, Taipei (TW); Chin-Lung Li, Taipei (TW); Chien-Chih Hsu, Taipei (TW)

(73) Assignee: CM HK LIMITED, Fortress Hill (HK)

( * ) Notice: Subject to any disclaimer, the term of this patent is extended or adjusted under 35 U.S.C. 154(b) by 0 days.

(21) Appl. No.: 15/357,176

(22) Filed: Nov. 21, 2016

(65) Prior Publication Data

US 2017/0082651 A1   Mar. 23, 2017

Related U.S. Application Data

(63) Continuation-in-part of application No. 14/088,452, filed on Nov. 25, 2013, now Pat. No. 9,534,927, which is a continuation-in-part of application No. 13/945,930, filed on Jul. 19, 2013, and a
(Continued)

(30) Foreign Application Priority Data

May 8, 2013 (CN) .................... 2013 2 0245496 U

(51) Int. Cl.
*G01P 13/00* (2006.01)
*G01D 3/10* (2006.01)
*G01C 22/00* (2006.01)

(52) U.S. Cl.
CPC ............ *G01P 13/00* (2013.01); *G01C 22/006* (2013.01); *G01D 3/10* (2013.01)

(58) Field of Classification Search
CPC ......... G01P 13/00; G01D 3/10; G01C 22/006; H04W 4/02; H04W 4/025–4/027
See application file for complete search history.

(56) References Cited

U.S. PATENT DOCUMENTS 4,965,550 A   10/1990   Wroblewski
5,355,503 A   10/1994   Soffel et al.
6,256,746 B1   7/2001   Cheng
(Continued)

OTHER PUBLICATIONS

Marquez et al., Motion-Logger: An Attitude and Motion Sensing System, Dec. 12-15, 2011, 2011 50th IEEE Conference on Decision and Control and European Control Conference (CDC-ECC), Orlando, FL, pp. 5311-5316.*
(Continued)

*Primary Examiner* — Toan Le
(74) *Attorney, Agent, or Firm* — McClure, Qualey & Rodack, LLP

(57) ABSTRACT

Methods of motion processing and related devices are provided. A representative method includes: generating a plurality of first sensor samples; generating a plurality of second sensor samples at a sampling rate according a first clock signal; storing the second sensor samples in a first buffer; fetching the first sensor samples; fetching the second sensor samples in batches from the first buffer; merging the first sensor samples and the second sensor samples to form a sensing merged signal; storing the sensing merged signal in a second buffer; providing a first preset processing signal; and selectively performing a second preset processing according to the first preset processing signal.

19 Claims, 6 Drawing Sheets

Related U.S. Application Data continuation-in-part of application No. 14/033,553, filed on Sep. 23, 2013, now Pat. No. 9,104,417.

(56) References Cited

U.S. PATENT DOCUMENTS

| | | |
|---|---|---|
| 6,557,107 B1 | 4/2003 | Kim |
| 7,000,469 B2 | 2/2006 | Foxlin et al. |
| 9,104,417 B2 | 8/2015 | Ye et al. |
| 2007/0113286 A1 | 5/2007 | Cromer et al. |
| 2008/0238772 A1 | 10/2008 | Soloviev et al. |
| 2009/0184849 A1 | 7/2009 | Nasiri et al. |
| 2009/0265671 A1 | 10/2009 | Sachs et al. |
| 2011/0109330 A1 | 5/2011 | Ikuta et al. |
| 2011/0163955 A1 | 7/2011 | Nasiri et al. |
| 2012/0022844 A1 | 1/2012 | Teixeira |
| 2012/0277545 A1 | 11/2012 | Texeira |
| 2014/0136871 A1 | 5/2014 | Jung et al. |

OTHER PUBLICATIONS

Wu et al. The Design of an Intelligent Pedometer Using Android, 2011 Second International Conference on Innovations in Bio-Inspired Computing and Applications, pp. 313-315.*

Soloviev et al., Utilizing Multipath Reflections in Deeply Integrated GPS/INS Architecture for Navigation in Urban Environments, 2008 IEEE, pp. 383-393.

Jia, Ning. "Fall Detection Application by Using 3-Axis Accelerometer ADXL345". Analog Devices. AN-1 023 Application Note. Copyright 2009. Availabile: http:/ /blog.ednch ina.geo.eet-en.com/ uploadedn/Biog/2009/7/1/32909b38-5e12-4a32-bd7 e-19e75256ed35.pdf.

* cited by examiner

METHOD OF MOTION PROCESSING AND RELATED MOBILE DEVICE AND MICROCONTROLLER UNIT

CROSS-REFERENCE TO RELATED APPLICATION

This application is a continuation-in-part application of and claims the priority benefit of a prior U.S. application Ser. No. 14/088,452, filed on Nov. 25, 2013 now U.S. Pat. No. 9,534,927, which is a continuation-in-part application of and claims the priority benefit of a prior U.S. application Ser. No. 13/945,930, filed on Jul. 19, 2013 now pending, and which is also a continuation-in-part application of and claims the priority benefit of a prior U.S. application Ser. No. 14/033,553, filed on Sep. 24, 2013 now patented as U.S. Pat. No. 9,104,417, issued on Aug. 11, 2015. The prior U.S. application Ser. No. 14/033,553 claims the priority benefit of China application serial no. 201320245496.X, filed on May 8, 2013. The entirety of each of the above-mentioned patent applications is hereby incorporated by reference herein and made a part of this specification.

BACKGROUND OF THE INVENTION

1. Field of the Invention

The present application relates to a microcontroller unit (MCU) of a mobile device. More particularly, the present application relates to an MCU including a buffer for storing samples for further processing and/or results of the processing.

2. Description of the Related Art

Nowadays a mobile device is often equipped with embedded sensors, such as accelerometer, gyro-sensor and magnetometer. The central processing unit (CPU) of the mobile device can collect samples generated by the sensors and perform some processing based on the samples. For example, the CPU can calculate the movement and the orientation of the mobile device or calculate how many steps the user of the mobile device has walked.

Since the sensors keep generating samples, the CPU has to receive and analyze the samples constantly. Therefore, the CPU has to be in its full operation mode for extended periods of time, which consumes electric power and shortens the battery life of the mobile device.

SUMMARY OF THE INVENTION

Accordingly, the present application is directed to a mobile device and an MCU of such a mobile device. The mobile device delegates the task of collecting and analyzing the samples generated by the sensor to the MCU to reduce power consumption.

According to an embodiment of the present application, a mobile device is provided. The mobile device includes a sensor, an MCU and a CPU. The sensor generates a plurality of samples. The MCU is coupled to the sensor. The MCU includes a buffer. The MCU fetches the samples from the sensor, performs a first preset processing according to the samples, and storing the samples and/or a result of the first preset processing in the buffer. The CPU is coupled to the MCU. The CPU fetches the result from the MCU or receives a signal based on the result from the MCU. The CPU performs a second preset processing according to the result or the signal.

According to another embodiment of the present application, a mobile device is provided. The mobile device includes a sensor and an MCU. The sensor generates a plurality of samples. The MCU is coupled to the sensor. The MCU includes a buffer. The MCU fetches the samples from the sensor, performs a preset processing according to the samples, stores the samples and/or a result of the preset processing in the buffer, and provides the result or a signal based on the result to an electronic device.

According to another embodiment of the present application, an MCU characterized by including a buffer is provided. The MCU fetches a plurality of samples from a sensor, performs a preset processing according to the samples, stores the samples and/or a result of the preset processing in the buffer, and provides the result or a signal based on the result to an electronic device.

It is one of the objectives of the present application to provide an electronic apparatus to solve the abovementioned problems raised in the prior art, such as inconvenient operations and huge power consumption.

According to one aspect of the present application, an electronic apparatus including a plurality of sensors, an application processor, and a micro-processor is provided. The plurality of sensors is configured to generate at least one sensing signal. The application processor is configured to execute an application procedure according to a sensing-merged signal. The micro-processor is coupled between the plurality of sensors and the application processor, and is configured to generate the sensing-merged signal according to the at least one sensing signal.

In a preferred embodiment of the electronic apparatus of the present application, the plurality of sensors includes an accelerometer, and the sensing signal generated by the accelerometer is used for controlling enabling and disabling of the micro-processor. In a preferred embodiment of the electronic apparatus of the present application, when the micro-processor detects that the sensing signal generated by the accelerometer is at high level, the micro-processor is enabled and is configured to computing the sensing signal according to an algorithm so as to generate the sensing-merged signal.

In a preferred embodiment of the electronic apparatus of the present application, a computing ability of the application processor is greater than a computing ability of the micro-processor.

By utilizing the electronic apparatus of the present application, not only operations become more convenient and power can be saved, but also the elasticity for choosing sensor chip vendors can be improved.

Accordingly, the present application is directed to an electronic device and a method of motion processing that can reduce the accumulated error in the numerical integration.

According to an embodiment of the present application, an electronic device is provided. The electronic device includes a motion sensor and a processor. The motion sensor is configured to perform a sampling at a sampling rate. In each sampling, the motion sensor generates a sample by sampling an angular velocity or an acceleration of the electronic device. The motion sensor is further configured to store each sample in a buffer of the motion sensor. The processor is coupled to the motion sensor and is configured to perform a polling at a polling rate. In each polling, the processor fetches a plurality of the samples from the buffer. The processor is further configured to perform a numerical integration based on the fetched samples.

According to another embodiment of the present application, a method of motion processing is provided. The method includes the following steps: performing a sampling at a sampling rate, wherein each sampling includes generating a sample by sampling an angular velocity or an acceleration of an electronic device; storing each sample in a buffer; performing a polling at a polling rate, wherein each polling includes fetching a plurality of the samples from the buffer; and performing a numerical integration based on the fetched samples.

According to another embodiment of the present application, an electronic device is provided. The electronic device includes a motion sensor and a processor. The motion sensor is configured to perform a sampling to generate a sample at a sampling rate, wherein the motion sensor is further configured to store each sample in a buffer of the motion sensor. The processor is coupled to the motion sensor and is configured to perform a polling at a polling rate, wherein in each polling the processor fetches a plurality of the samples from the buffer.

According to another embodiment of the present application, a method of motion processing is provided. The method includes: generating a plurality of first sensor samples; generating a plurality of second sensor samples at a sampling rate according a first clock signal; storing the second sensor samples in a first buffer; fetching the first sensor samples and the second sensor samples; merging the first sensor samples and the second sensor samples to form a sensing merged signal; storing the sensing merged signal in a second buffer; providing a first preset processing signal; and selectively performing a second preset processing according to the sensing merged signal or the first preset processing signal; wherein the first preset processing signal and the sensing merged signal are selectively fetched in batches according to a second clock signal.

According to another embodiment of the present application, a mobile device is provided. The mobile device includes an accelerometer configured to generate acceleration signals. A gyroscope is configured to generate samples at a sampling rate according a first clock, and store the samples in a first buffer of the gyroscope. A microcontroller unit (MCU), coupled to the accelerometer and the gyroscope, incorporates a second buffer, configured to fetch the samples from the first buffer of the gyroscope in batches, merge the acceleration signals and the samples to store a sensing merged signal in the second buffer according to the acceleration signals and the samples. A central processing unit (CPU), coupled to the MCU, is configured to fetch the sensing merged signal from the MCU or receive a first preset processing signal based on a calculating according to a first preset processing from the MCU, and perform a second preset processing according to the sensing merged signal or the first preset processing signal, wherein the first preset processing signal and the sensing merged signal are respectively fetched in batches according to a second clock of the central processing unit.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
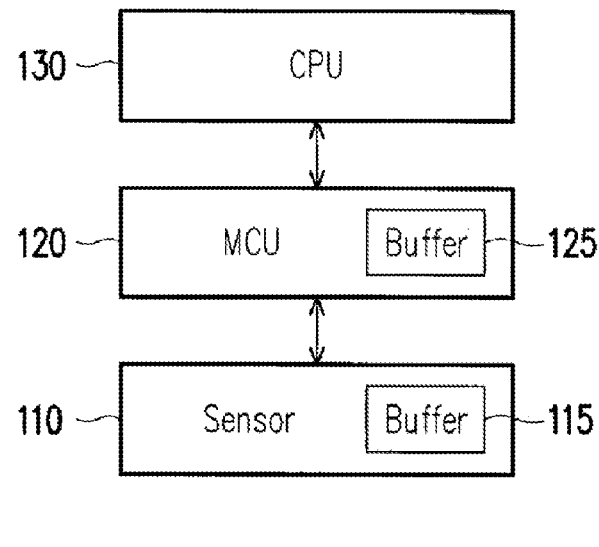
FIG. 1 is a schematic diagram showing a mobile device according to an embodiment of the present application.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing a mobile device 100 according to an embodiment of the present application. The mobile device 100 may be a remote controller, a smart phone, a personal digital assistant (PDA), a tablet computer, or a notebook computer, etc. The mobile device 100 includes a sensor 110, an MCU 120, and a CPU 130. The MCU 120 is coupled to the sensor 110. The CPU 130 is coupled to the MCU 120. The sensor 110 includes a buffer 115. The MCU 120 includes a buffer 125. The buffers 115 and 125 are storage devices, such as register or memory.

The sensor 110 generates a plurality of samples. The sensor 110 may store the samples in the buffer 115. The MCU 120 fetches the samples from the sensor 110 and performs an initial preset processing according to the samples to generate one or more results of the initial preset processing. The MCU 120 may store either the samples or the result(s) in the buffer 125. Alternatively, the MCU 120 may store both the samples and the result(s) in the buffer 125.

The CPU 130 fetches the one or more results from the MCU 120 or receives a signal based on the one or more results from the MCU 120. The CPU 130 performs further preset processing according to the one or more results or the signal from the MCU 120.

In an embodiment of the present application, the sensor 110 generates the samples at a frequency $F_1$, which means the sensor 110 generates $F_1$ samples every second. The MCU 120 fetches the samples from the sensor 110 in batches at a frequency $F_2$. The CPU 130 fetches the results from the MCU 120 in batches at a frequency $F_3$. The frequency $F_1$ may be higher than or equal to the frequency $F_2$. The frequency $F_2$ may be higher than or equal to the frequency $F_3$.

For example, $F_1$ may be 2000 Hz, $F_2$ may be 1 Hz, and $F_3$ may be 0.001 Hz. The sensor 110 generates 2000 samples every second. The MCU 120 fetches the samples from the sensor 110 once in every second. In each fetching, the MCU 120 fetches the 2000 samples as a single batch from the sensor 110. After each fetching, the MCU 120 performs the initial preset processing and generates 40 results based on the 2000 samples. The CPU 130 fetches the 40 results as a single batch from the MCU 120 once every 1000 seconds. After each fetching, the CPU 130 performs further preset processing according to the 40 results. This batch fetching mechanism alleviates the burden of obtaining samples of the MCU 120 because the MCU 120 does not have to fetch the samples one by one from the sensor 110. Similarly, this batch fetching mechanism alleviates the burden of obtaining results of the CPU 130 because the CPU 130 does not have to fetch the results one by one from the MCU 120.

The CPU 130 executes the operating system (OS) and the applications of the mobile device 100. The further preset processing is just one of many tasks performed by the CPU 130. The MCU 120 is exclusively dedicated to performing the initial preset processing according to the samples and providing the one or more results or the signal to the CPU 130. The CPU 130 has much more processing power than the MCU 120 does and the CPU 130 consumes much more electric power than the MCU 120 does. The MCU 120 takes over the burden of collecting the samples from the sensor 110 and performing the initial preset processing from the CPU 130 so that the CPU 130 can sleep as long as possible in order to save power and extend the battery life of the mobile device 100. The batch fetching of results from the MCU 120 helps to reduce the waking frequency of the CPU 130, which saves more power. The MCU 120 constantly polls the sensor 110 and fetches the samples from the sensor 110. The MCU 120 never sleeps.

The CPU 130 may sleep until the CPU 130 wakes up to fetch the result from the MCU 120 or until the CPU 130 is woke up by the signal from the MCU 120. The MCU 120 may wake up the CPU 130 and notifies the CPU 130 to fetch the result from the MCU 120. Alternatively, the CPU 130 may wake up when the user of the mobile device 100 launches an application or when a timer expires. In other words, the CPU 130 may wake up without notification from the MCU 120, and then the CPU 130 may fetch the one or more results from the MCU 120.

Figure 2:
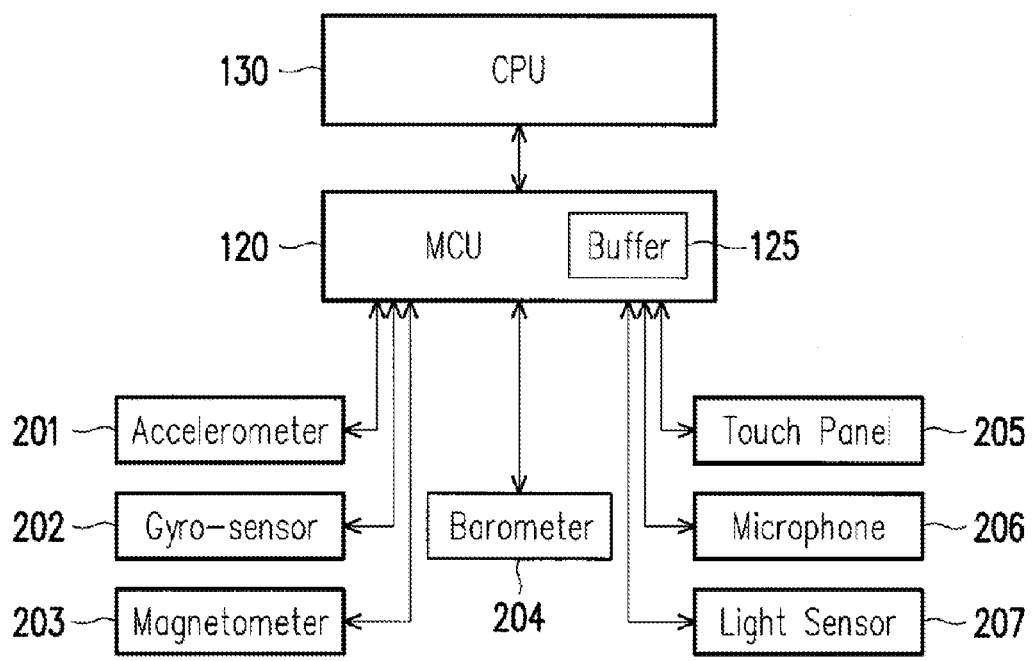
FIG. 2 is a schematic diagram showing a mobile device according to another embodiment of the present application.

FIG. 2 is a schematic diagram showing a mobile device 200 according to another embodiment of the present application. The mobile device 200 includes the CPU 130, the MCU 120, and seven sensors 201-207, namely, the accelerometer 201, the gyro-sensor 202, the magnetometer 203, the barometer 204, the touch panel 205, the microphone 206, and the light sensor 207. The accelerometer 201 generates samples of accelerations associated with movements and rotations of the mobile device 200. The gyro-sensor 202 generates samples of angular velocities associated with movements and rotations of the mobile device 200. The magnetometer 203 generates samples of magnetism associated with movements and rotations of the mobile device 200. The barometer 204 generates samples of atmospheric pressures associated with movements and rotations of the mobile device 200. The touch panel 205 generates samples of locations touched by the user of the mobile device 200. The microphone 206 generates samples of sound around the mobile device 200. The light sensor 207 generates samples of the ambient brightness around the mobile device 200. Each of the sensors 201-207 may include a buffer as the sensor 110 does.

The MCU 120 is coupled to all of the sensors 201-207 and operates as a sensor hub. Each subset of the mobile device 200 including the CPU 130, the MCU 120, and one of the sensors 201-207 may operate in the same ways as the mobile device 100 shown in FIG. 1 does. In addition, the MCU 120 and the CPU 130 may perform preset processing based on samples generated by multiple sensors altogether. In another embodiment of the present application, the mobile device 200 may include less than seven sensors or more than seven sensors.

In an embodiment of the present application, the mobile device 200 may provide the function of a pedometer. The MCU 120 fetches the samples from the accelerometer 201 and performs the initial preset processing by calculating how many steps the user of the mobile device 200 has walked according to the samples. The MCU 120 may store the result of the initial preset processing, namely, the number of steps, in the buffer 125.

The MCU 120 may wake up the CPU 130 to fetch the result every N steps, wherein N is a preset positive integer. Alternatively, the CPU may wake up periodically to fetch the result from the MCU 120. Alternatively, the CPU may wake up whenever the user launches an application to see the number of steps. The infrequent awakening of the CPU 130 saves energy. Sometimes the user walks for hours and does not want to see the number of steps until the user arrives at home. In this case, the CPU 130 may sleep for hours and saves a lot of energy.

In addition to counting the number of steps, the initial preset processing performed by the MCU 120 may include calculating the direction and the distance of each step of the user according to the samples generated by the accelerometer 201, the gyro-sensor 202, and the magnetometer 203. The MCU 120 may store the results, namely, the directions and distances of the steps, in the buffer 125. The MCU 120 may wake up the CPU 130 and notifies the CPU 130 to fetch the results when the size of the results reaches a preset percentage of the capacity of the buffer 125.

When the CPU 130 wakes up, the further preset processing performed by the CPU 130 may include displaying the number of steps, displaying a chart showing the number of steps in each hour, or plotting the trace of the user according to the directions and the distances of the steps, etc.

In another embodiment of the present application, the mobile device 200 may provide functions of positioning and navigation based on the Global Positioning System (GPS). The user may turn off the GPS function to save power. The CPU 130 sleeps when the GPS function is turned off. During the period when the GPS function is turned off, the MCU 120 may fetch the samples generated by the accelerometer 201, the gyro-sensor 202, and the magnetometer 203 to calculate the moving trace of the mobile device 200. The MCU 120 may store the moving trace in the buffer 125 as the result of the initial preset processing. When the user turns on the GPS function, the CPU 130 may fetch the moving trace from the MCU 120 and use the moving trace and the last GPS position of the mobile device 200 to calculate a reference position so that the CPU 130 can find the current GPS position of the mobile device 200 faster.

In another embodiment of the present application, the MCU 120 may calculate the moving trace of the mobile device 200 according to the samples generated by the barometer 204 in addition to the samples generated by the accelerometer 201, the gyro-sensor 202, and the magnetometer 203, so that the moving trace can include more accurate estimation of the change of altitude of the mobile device 200.

In another embodiment of the present application, the mobile device 200 may switch between an unlocked state and a locked state. The mobile device 200 receives input from the touch panel 205 normally in the unlocked state, while the mobile device 200 does not receive input from the touch panel 205 in the locked state. The CPU 130 sleeps in the locked state. For example, the mobile device 200 may enter the locked state from the unlocked state when the mobile device 200 has been idle for a preset period of time, and the mobile device 200 may return to the unlocked state when the user performs a preset operation on the mobile device 200.

The preset operation for unlocking the mobile device 200 may be drawing a preset trace on the touch panel 205. In this case, the MCU 200 may fetch the samples generated by the touch panel 205 and analyze the samples to determine whether the user draws the preset trace or not. When the user finishes the preset trace on the touch panel 205, the MCU 120 may send a signal, such as an interrupt, to wake up the CPU 130. The CPU 130 switches the mobile device 200 from the locked state to the unlocked state in response to the signal.

Alternatively, the preset operation for unlocking the mobile device 200 may be speaking a preset password to the microphone 206. In this case, the MCU 200 may fetch the samples generated by the microphone 206 and perform speech recognition on the samples to determine whether the user speaks the preset password or not. When the user speaks the preset password to the microphone 206, the MCU 120 may send a signal to wake up the CPU 130. The CPU 130 switches the mobile device 200 from the locked state to the unlocked state in response to the signal.

Alternatively, the preset operation for unlocking the mobile device 200 may be holding the mobile device 200 and moving the mobile device 200 along a preset trace. In this case, the MCU 200 may fetch the samples generated by the accelerometer 201, the gyro-sensor 202, and the magnetometer 203 and analyze the samples to determine whether the mobile device 200 has moved along the preset trace or not. When the mobile device 200 has moved along the preset trace, the MCU 120 may send a signal to wake up the CPU 130. The CPU 130 switches the mobile device 200 from the locked state to the unlocked state in response to the signal.

In another embodiment of the present application, the mobile device 200 may include a display. The MCU 120 may fetch the samples generated by the light sensor 207 and analyze the samples to calculate the average ambient brightness of the mobile device 200 over a recent period of time with a predetermined length. The MCU 120 may store the average ambient brightness in the buffer 125. The CPU 130 may fetch the average ambient brightness periodically and adjusts the display brightness of the display according to the average ambient brightness.

Figure 3:
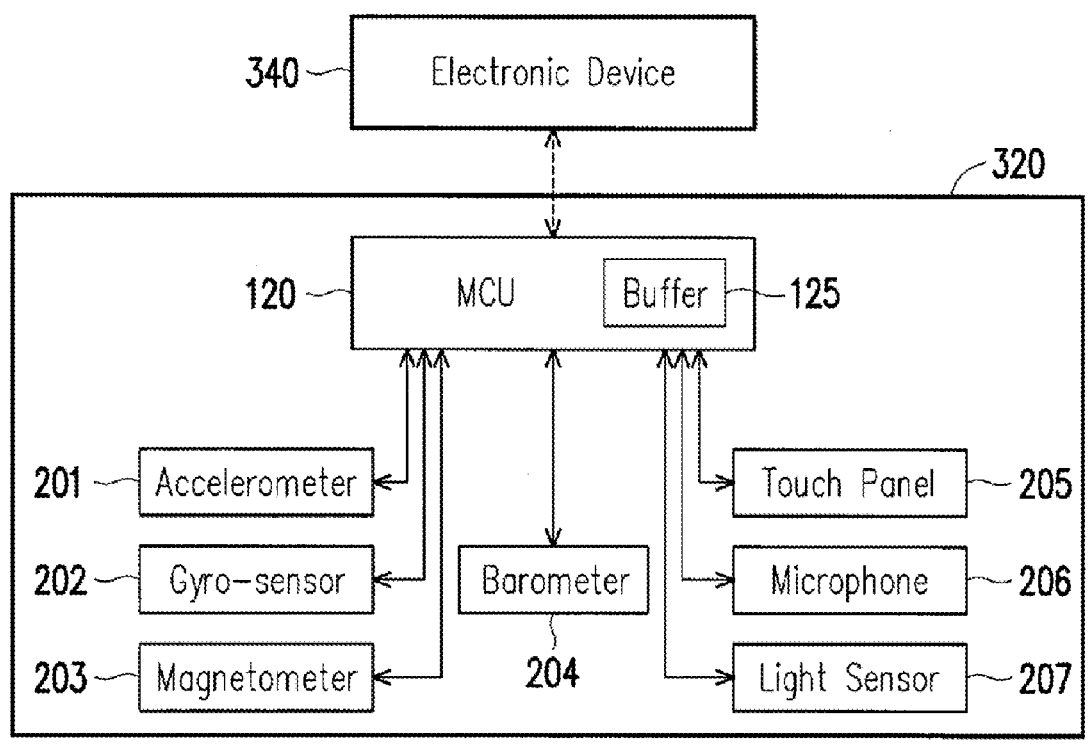
FIG. 3 is a schematic diagram showing a mobile device according to another embodiment of the present application.

FIG. 3 is a schematic diagram showing a mobile device 320 according to another embodiment of the present application. The mobile device 320 includes the MCU 120 and the sensors 201-207. Similar to the previous embodiments, the MCU 120 may fetch the samples generated by one or more of the sensors 201-207 and performs the initial preset processing according to the samples. The MCU 120 may store the samples and/or the result(s) of the initial preset processing in the buffer 125. The MCU 120 in this embodiment is configured to connect to the electronic device 340 through a wireless connection or a wired connection. The MCU 120 is further configured to provide the result(s) of the initial preset processing to the electronic device 340 through the wireless connection or the wired connection. The electronic device 340 may perform further preset processing according to the one or more results. In some aspects, the electronic device 340 is analogous to the CPU 130 in the previous embodiments.

For example, the mobile device 320 may be a wearable electronic pedometer. The MCU 120 counts the number of steps walked by the user according to the samples generated by the accelerometer 201. The MCU 120 may store the number of steps in the buffer 125. In addition, the MCU 120 may provide the number of steps to the electronic device 340 for further viewing or processing.

For another example, the mobile device 320 may be a small device attachable to a palm or an arm of a user or a golf stick wielded by the user. When the user plays golf, the MCU 120 may fetch the samples generated by the accelerometer 201, the gyro-sensor 202, and the magnetometer 203 to calculate the number of swings of the golf stick made by the user. The MCU 120 may store the number of swings in the buffer 125. In addition, the MCU 120 may provide the number of swings to the electronic device 340 for further viewing or processing.

Alternatively, the MCU may analyze the samples generated by the accelerometer 201, the gyro-sensor 202, and the magnetometer 203 to obtain the time and force of each swing of the golf stick made by the user. The MCU 120 may store the results of the analysis in the buffer 125. In addition, the MCU 120 may provide the results of the analysis to the electronic device 340 for further viewing or processing.

In summary, the MCU provided by the present application is a sensor hub with a buffer. The MCU can take over the burden of collecting and analyzing the samples generated by the sensors from the CPU of a mobile device. As a result, the MCU alleviates the burden of the CPU and the CPU may sleep as long as possible to save energy and extend the battery life of the mobile device.

Figure 4:
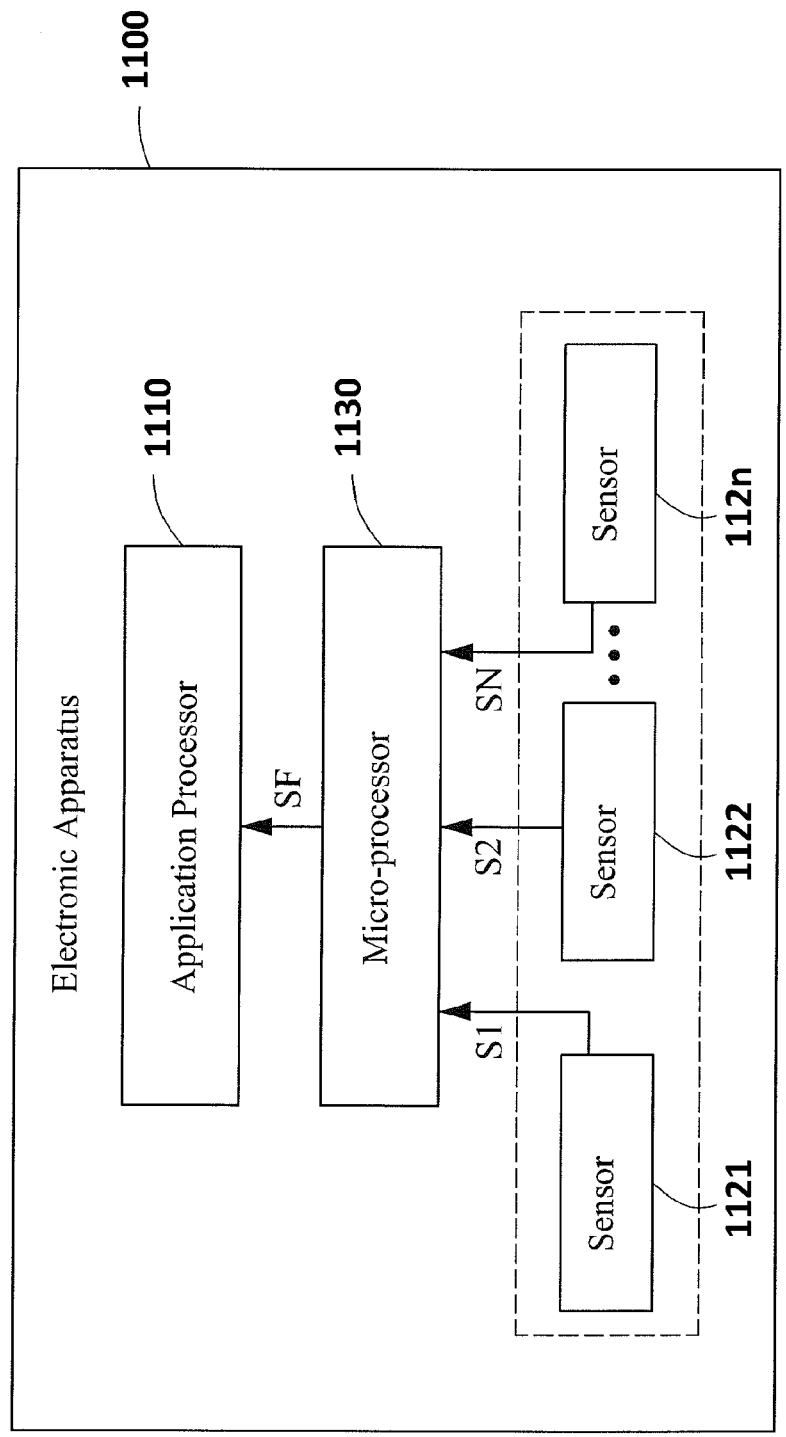
FIG. 4 is a diagram showing an electronic apparatus according to another embodiment of the present application.

Please refer to FIG. 4. FIG. 4 is a diagram showing an electronic apparatus 1100 according to another embodiment of the present application. The electronic apparatus 1100 can be a mobile phone, a tablet PC, a PDA, etc. The electronic apparatus 1100 may include, but is not limited to, an application processor 1110, a plurality of sensors 1121-112$n$, and a micro-processor 1130. The plurality of sensors 1121-112$n$ is configured to generate at least one sensing signal(s) S1-Sn. The application processor 1110 is configured to execute an application procedure according to a sensing-merged signal SF. The micro-processor 1130 is coupled between the plurality of sensors 1121-112$n$ and the application processor 1110, and is configured to generate the sensing-merged signal SF according to the at least one sensing signal(s) S1-Sn.

The plurality of sensors 1121-112$n$ mentioned above can be implemented by an accelerometer, a rotation sensor, a magnetometer, and/or an altimeter, however, this should not be a limitation of the present application. In addition, please note that, a computing ability of the application processor 1110 is greater than a computing ability of the micro-processor 1130. For example, the application processor 1110 may be a multi-core baseband processor of a mobile phone, and the micro-processor 1130 may be a single chip microcontroller. Those skilled in the art should understand the difference(s) between the application processor 1110 and the micro-processor 1130 easily, and thus further description is omitted here for brevity.

Please be noted that, when the application processor 1110 of the electronic apparatus 100 of the present application gets into a sleep mode, the micro-processor 1130 is still working so as to maintain fundamental functions of the electronic apparatus 1100. As a result, even if the handheld electronic apparatus 1100 gets into the sleep mode, the application processor 1110 can be waked up through detecting motions of the electronic apparatus 1100. For example, when the application processor 1110 gets into the sleep mode, the application processor 1110 turns off a display module (not shown) of the electronic apparatus 1100, and locks a touch panel (not shown) of the electronic apparatus 1100. The locking mechanism of the electronic apparatus 1100 of the present application is listed below. Step (1): a user swings the electronic apparatus 1100, and motions and/or rotations of the electronic apparatus 100 are detected by the plurality of sensors 1121-112n so as to generate sensing signals S1-Sn; step (2) the sensing-merged signal SF, which can be used for waking up the application processor 1110, is then generated by the micro-processor 1130 according to the sensing signals S1-Sn; and step (3) the application processor 1110 receives the sensing-merged signal SF and then executes an application procedure according to the sensing-merged signal SF. For example, the application processor 1110 may compare the sensing-merged signal SF to see whether it corresponds to a specific gesture or not; and if the sensing-merged signal SF corresponds to the specific gesture, the abovementioned display module will be enabled and enter an unlocked status automatically. Therefore, the electronic apparatus 1100 no need to have a physical button as the prior art, and the user no need to press the physical button so as to unlock the electronic apparatus 1100. In addition, when the display module of the electronic apparatus 1100 is turned off, the application processor 1110 can continue to play back music. The electronic apparatus 1100 of the present application can generate motion data through detecting motions and/or rotations according to the plurality of sensors 1121-112n when the user swings the electronic apparatus 1100; and the micro-processor 1130 can process the motion data and then the application processor 1110 can control the played music. For example, the user can beat the left side of the electronic apparatus 1100 so as to select to play back a previous song, or beat the right side of the electronic apparatus 1100 so as to select to play back a next song.

On the other hand, another advantage of the present application is that: the function of the step counter, or pedometer, can still work after the application processor 1110 gets into the sleep mode. For example, when the application processor 1110 gets into the sleep mode and the electronic apparatus 1100 uses the function of the step counter, the sensor 1121 (such as an accelerometer) can generate the at least one sensing signal S1. The micro-processor 1130 can generate a counting information according to the at least one sensing signal S1 generated by the accelerometer. Please note that, in another embodiment of the present application, the micro-processor 1130 can set a default counting information, such as 1000 counts. That is to say, when the counting information is up to 1000 counts, the micro-processor 1130 can wake up the application processor 1110 by using the sensing-merged signal SF.

Figure 5:
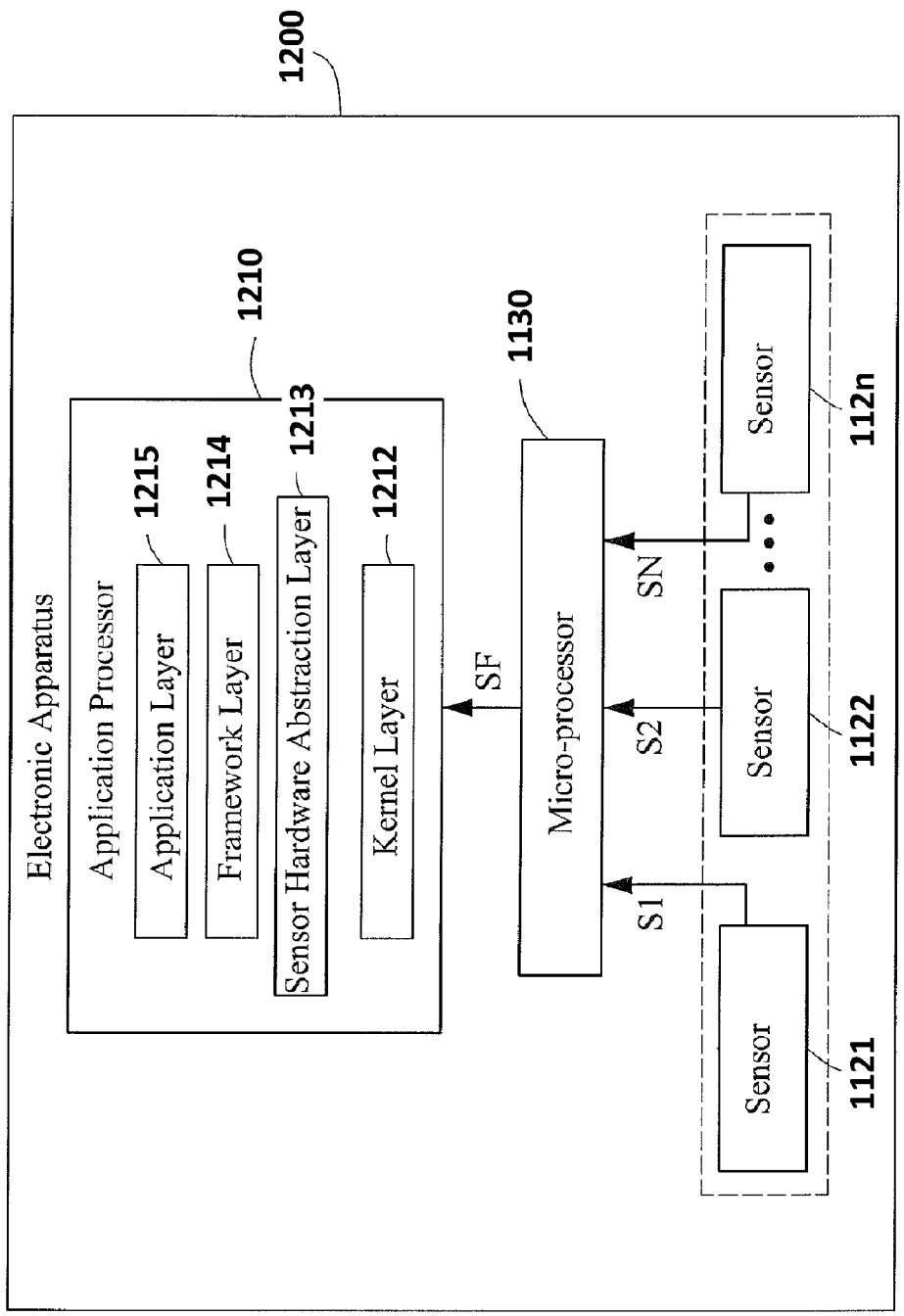
FIG. 5 is a diagram showing an electronic apparatus according to another embodiment of the present application.

Please refer to FIG. 5. FIG. 5 is a diagram showing an electronic apparatus 1200 according to a second embodiment of the present application. The electronic apparatus 1200 may include an application processor 1210, a micro-processor 1130, and a plurality of sensors 1121-112n. The plurality of sensors 1121-112n mentioned above can be implemented by an accelerometer, a rotation sensor, a magnetometer, and/or an altimeter. The application processor 1210 may include a Kernel layer 1212, a sensor hardware abstraction layer (sensor HAL) 1213, a framework layer 1214, and an application layer 1215, wherein the application layer 1215 can be Android System's application layer. The micro-processor 1130 is disposed between the application processor 1210 and the plurality of sensors 1121-112n. The plurality of sensors 1121-112n will generate corresponding sensing signals S1-SN after sensing, and will transmit the sensing signals S1-SN to the micro-processor 1130. The micro-processor 1130 merges the sensing signals S1-SN generated by the plurality of sensors 1121-112n and then transmits a sensing-merged signal SF to the application processor 1210. The application processor 1210 executes a corresponding application procedure according to the sensing-merged signal SF. Please be noted that, the communication between the application processor 1210 and the micro-processor 1130 is implemented by an internal integrated circuited port; and the communication between the micro-processor 1130 and the plurality of sensors is implemented by an internal integrated circuited port; however, this should not be a limitation of the present application.

The electronic apparatus 1100/1200 is characterized in that: the micro-processor 1130 can be selectively enabled or disabled to save power. For example, the plurality of sensors 1121-1212N may include an accelerometer, and the sensing signal generated by the accelerometer can be used for controlling enabling and disabling of the micro-processor 1130. In more details, when the accelerometer generates an acceleration-related sensing signal, it represents that the electronic apparatus 1100/1200 is moving (for example, the sensing signal can be at a high level at this time) so as to enable the micro-processor 1130. After the micro-processor 1130 is enabled, it can merge the sensing signals S1-SN generated by the plurality of sensors 1121-112n to generate a sensing-merged signal SF according to an algorithm. The sensing-merged signal SF is then transmitted from the micro-processor 1130 to the application processor 1110/1210 in order to let the application processor 1110/1210 execute the corresponding application procedure.

Figure 6:
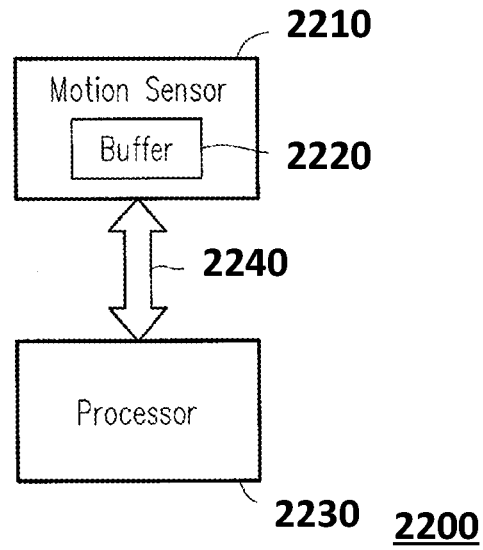
FIG. 6 is a schematic diagram showing an electronic device according to another embodiment of the present application.

The advantage of the configuration of the present application is that: determining whether to enable the micro-processor 1130 to save power by using characteristics of the plurality of sensors. For example, in the abovementioned embodiment, it can determine whether to enable the micro-processor 1130 by adopting the accelerometer sensor. In other words, the electronic apparatus 1100/1200 with such configuration can determine whether to enable the micro-processor 1130 to execute the corresponding application procedure to save power based on the motion detection itself. Please be noted that, in one embodiment of the electronic apparatus 1100/1200 of the present application, the micro-processor 1130 and at least one of the plurality of sensors 1121-112n are not packed in a single chip, however, this should not be a limitation of the present application. Some of the plurality of sensors 1121-112n can be packed in a single chip. Furthermore, the micro-processor 1130 is independent with the application processor 1110/1210, and they are not packed in a single chip. Please note that, driver programs of the plurality of sensors 1121-112n can be preloaded into the micro-processor 1130. Therefore, if a developer adopts the micro-processor 1130 of the present application, the sensing signals S1-SN of the plurality of sensors 1121-112n can be successfully processed. The advantage of the configuration of the present application is that: the elasticity for choosing sensor chip vendors can be improved. FIG. 6 is a schematic diagram showing an electronic device 2200 according to an embodiment of the present application. The electronic device 2200 may be a smart phone, a personal digital assistant (PDA), a tablet computer, a remote control, or any other electronic device that can be moved and/or rotated. The electronic device 2200 includes a motion sensor 2210, a processor 2230, and a bus 2240. The motion sensor 2210 includes a buffer 2220. The processor 2230 is coupled to the motion sensor 2210 through the bus 2240.

Please note that the motion sensor may be a gyro-sensor, an accelerometer, a 6-axis motion sensor or a 9-axis motion sensor. In an embodiment of the present application, the motion sensor 2210 may be a gyro-sensor that detects and samples the angular velocity of the electronic device 2200. In another embodiment of the present application, the motion sensor 2210 may be an accelerometer that detects and samples the acceleration of the electronic device 2200. In another embodiment of the present application, the motion sensor 2210 may be a 6-axis motion sensor that detects and samples the acceleration or the angular velocity of the electronic device 2200. In another embodiment of the present application, the motion sensor 2210 may be a 9-axis motion sensor that detects and samples the acceleration, the angular velocity or the magnetism of the electronic device 2200. Those skilled in the art can readily understand 6-axis motion sensor comprises a 3-axis gyroscope and a 3-axis accelerometer, and further description is omitted here for brevity. Similarly, the 9-axis motion sensor comprises a 3-axis gyroscope, a 3-axis accelerometer and a 3-axis compass, and further description is omitted here for brevity. The buffer 2220 may be a first-in-first-out (FIFO) register that can store a plurality of samples produced by the motion sensor 2210. The processor 2230 may be the CPU, a microprocessor, or an embedded controller of the electronic device 2200.

Figure 7:
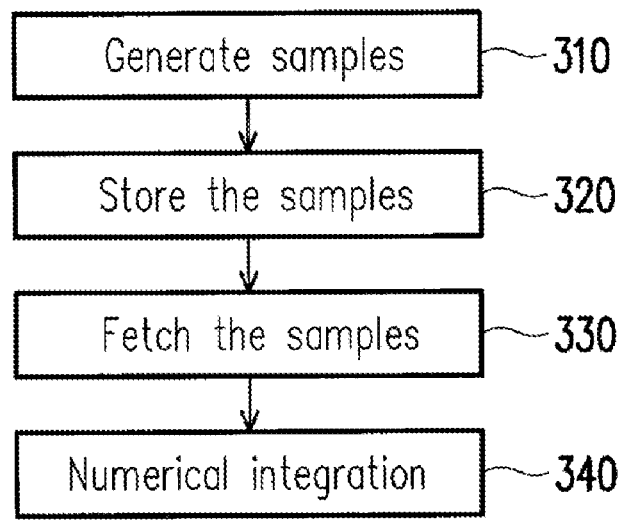
FIG. 7 is a flow chart showing a method of motion processing according to another embodiment of the present application.

FIG. 7 is a flow chart showing a method of motion processing according to an embodiment of the present application. The method shown in FIG. 7 may be executed by the electronic device 2200. In step 310, the motion sensor 2210 performs a sampling at a predetermined sampling rate. The processor 2230 may set the sampling rate for the motion sensor 2210 by accessing a configuration register of the motion sensor 2210 before executing the method shown in FIG. 7. In each sampling, the motion sensor 2210 generates a sample by sampling an angular velocity or an acceleration of the electronic device 2200. In step 320, the motion sensor 2210 stores each sample generated in step 310 in the buffer 2220.

In step 330, the processor 2230 polls the motion sensor 2210 periodically at a predetermined polling rate. The sampling rate for the motion sensor 2210 may be higher than or equal to the polling rate for the processor 2230. Therefore, each time when the processor 2230 polls the motion sensor 2210, there may be already a plurality of samples stored in the buffer 2220 so that the processor 2230 may fetch more than one sample from the buffer 2220. The processor 2230 may fetch a part or all of the samples stored in the buffer 2220 in each aforementioned polling. The processor 2230 performs the polling and the fetching through the bus 2240.

In step 340, the processor 2230 performs a numerical integration based on the samples fetched in step 330. When the motion sensor 2210 is a gyro-sensor, the samples may be angular velocities of the electronic device 2200 and the result of the numerical integration may be an angle of the rotation or the orientation of the electronic device 2200. When the motion sensor 2210 is an accelerometer, the samples may be accelerations of the electronic device 2200 and the result of the numerical integration may be a velocity or a distance of the translation of the electronic device 2200. The processor 2230 may use a part or all of the samples fetched in step 330 to perform the numerical integration. The more samples used, the smaller the accumulated error of the numerical integration.

Figure 8:
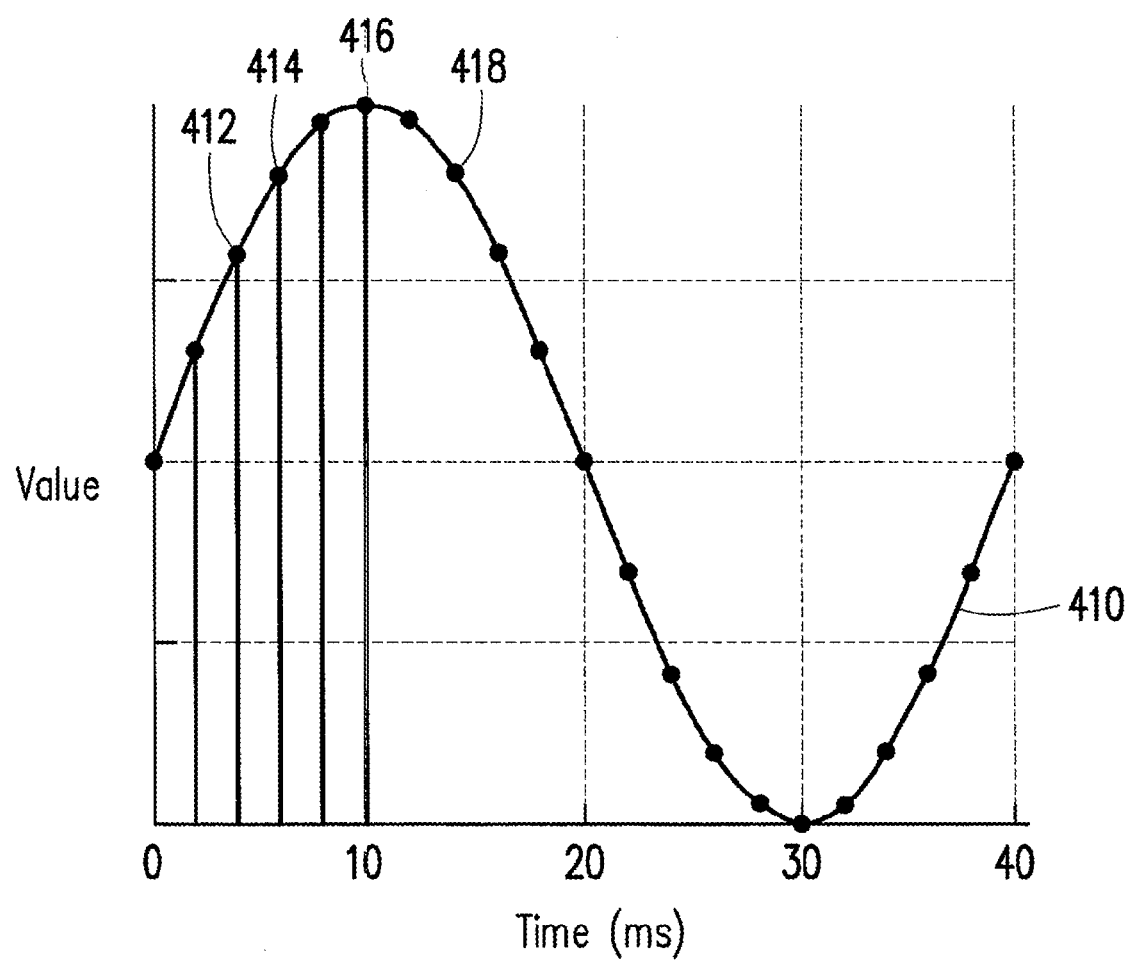
FIG. 8 is a schematic diagram showing the sampling of a motion processing according to another embodiment of the present application.

FIG. 8 is a schematic diagram showing the sampling of a motion processing of the electronic device 2200 according to an embodiment of the present application. The curve 410 represents the angular velocity or the acceleration sampled by the motion sensor 2210. The samples are represented by round dots on the curve 410, such as the samples 412, 414, 416 and 418.

In this embodiment, the sampling rate of the motion sensor 2210 is 500 Hz and the polling rate of the processor 2230 is 100 Hz. In other words, the motion sensor 2210 produces a sample every two milliseconds, while the processor 2230 polls the motion sensor 2210 every ten milliseconds. At each polling, there are already five samples stored in the buffer 2220 waiting for the processor 2230. The processor 2230 may fetch a part or all of the five samples stored in the buffer 2220.

In this way, the processor 2230 may set the sampling rate of the motion sensor 2210 to be much higher than the polling rate of the processor 2230 such that there are a lot of samples available to the processor 2230 at each polling. The low polling rate can free the processor 2230 from frequently accessing the bus 2240 for the polling and the fetching so that the processor 2230 has more time to process the other tasks of the electronic device 2200. In addition, the high sampling rate of the motion sensor 2210 means more samples and smaller accumulated error of the numerical integration.

In this embodiment, the processor 2230 uses the sampling period corresponding to the sampling rate of the motion sensor 2210 as the height (or width) of the trapezoids defined by the samples to perform the numerical integration in step 340. In other words, the processor 2230 performs the numerical integration according to the clock of the motion sensor 2210 instead of the clock of the processor 2230 itself, which eliminates the accumulated error caused by two asynchronous clocks. The motion sensor 2210 is dedicated to generating the samples according to its own clock. Unlike the processor 2230, the motion sensor 2210 has no other distracting tasks. Therefore, the sampling time of the motion sensor 2210 is very accurate, which helps to reduce the accumulated error of the numerical integration.

In summary, the present application can effectively reduce the accumulated error of the numerical integration in motion processing by more accurate sampling time and higher sampling rate. Moreover, the present application does not require a dedicated pin of the processor because the processor does not need interrupt for fetching the samples.

It should be noted that, in some embodiments, fetch behavior of the processing signal from sensor hub (MCU) to the application processor (AP or CPU) may be altered depending on the application. By way of example, for gaming applications (which may require a relatively fast update frequency), the system may defer to using a bypass mode, in which batch fetching may not be performed. A potential disadvantage in using such a bypass mode may involve the AP needing to wake up frequently (e.g., waking up every time it retrieves signals from the MCU). In contrast, for 0 or health monitoring functions (which may not require updating as fast), the AP would fetch processing signals in batch mode to reduce power consumption.

Meanwhile, in some embodiments, a gyroscope may need to fetch samples in batch mode such as under a precise clock of the gyroscope or an outside timer. This is because the samples generated by the gyroscope are in the form of relative vectors. Such relative vectors typically are computed under integral calculation to obtain a relative rotation angle. As a result, the sampled data is typically reserved in a sequence format (similar to streaming) in the buffer in order to increase accuracy. Thus, accuracy is a primary reason for using the batch mode in the sensor side, though power consumption may also be a consideration.

Unlike that of the gyroscope, samples generated by the accelerometer are absolute directional vectors. With respect to system usage, the system may not need to retrieve accelerometer samples as frequently as gyroscope samples. For instance, the MCU may retrieve accelerometer samples in 20-40 ms without much deviation, while the MCU may retrieve gyroscope samples in 5 ms. Therefore, the accelerator samples may only need to be uploaded to the MCU when the MCU determines that a sample is required.

It will be apparent to those skilled in the art that various modifications and variations can be made to the structure of the present application without departing from the scope or spirit of the invention. In view of the foregoing, it is intended that the present application cover modifications and variations of this invention provided they fall within the scope of the following claims and their equivalents.

The invention claimed is:

1. A mobile device, comprising:
    an accelerometer, generating acceleration signals;
    a gyroscope, generating samples at a sampling rate according a first clock of the gyroscope, storing said samples in a first buffer of the gyroscope;
    a microcontroller unit (MCU), coupled to the accelerometer and the gyroscope, comprising a second buffer, fetching the samples from the first buffer of the gyroscope in batches, merging the acceleration signals and the samples to store a sensing merged signal in the second buffer according to the acceleration signals and the samples; and
    a central processing unit (CPU), coupled to the MCU, receiving a first preset processing signal based on a calculating according to the sensing merged signal from the MCU, and performing a second preset processing according to the first preset processing signal;
    wherein the CPU selectively fetches the sensing merged signal from the MCU and receives the first preset processing signal, and selectively performs the second preset processing according to the sensing merged signal and the first preset processing signal, respectively;
    wherein, when the MCU operates in a batch mode, the first preset processing signal and the sensing merged signal are respectively received and fetched in batches by the CPU according to a second clock different from the first clock; and
    wherein when the MCU operates in a bypass mode, the first preset processing signal and the sensing merged signal are not received and fetched in batches.

2. The mobile device of claim 1, wherein a number of times the MCU fetches the samples during a first time interval is smaller than a number of times the gyroscope generates one of the samples during the first time interval.

3. The mobile device of claim 1, wherein a number of times the CPU selectively receives and fetches the first preset processing signal and the sensing merged signal during a second time interval is smaller than a number of times the MCU fetches the samples during the second time interval.

4. The mobile device of claim 3, wherein the number of times the MCU fetches the samples during the first time interval is smaller than the number of times the sensor generates one of the samples during the first time interval to reduce computed accumulated error and/or power consumption of the MCU, and the number of times the CPU selectively received and fetches the first preset processing signal and the sensing merged signal during the second time interval is smaller than the number of times the MCU fetches the samples during the second time interval to reduce power consumption of the CPU.

5. The mobile device of claim 1, wherein the CPU sleeps until the CPU wakes up in response to a notification generated by the MCU to perform the fetching.

6. The mobile device of claim 5, wherein the microprocessor is configured to generate a step counting information according to the acceleration signals generated by the accelerometer, and responsive to the step counting information reaching a predetermined number, the MCU is further configured to wake up the CPU using the notification.

7. The mobile device of claim 1, wherein the CPU wakes up without notification from the MCU and then performs the fetching.

8. The mobile device of claim 1, wherein the MCU never sleeps.

9. A method of motion processing of a mobile device having a first sensor, a second sensor, a microcontroller unit (MCU) and a central processing unit (CPU), the method comprising:
    generating a plurality of first sensor samples;
    generating a plurality of second sensor samples at a sampling rate according a first clock signal;
    storing the second sensor samples in a first buffer;
    fetching the first sensor samples;
    fetching the second sensor samples in batches from the first buffer;
    merging, by the MCU, the first sensor samples and the second sensor samples to form a sensing merged signal;
    storing the sensing merged signal in a second buffer;
    providing a first preset processing signal; and
    selectively performing a second preset processing according to the first preset processing signal;
    wherein, when operating in a batch mode, the first preset processing signal and the sensing merged signal are respectively received and fetched in batches by the CPU according to a second clock different from the first clock to reduce power consumption; and
    wherein, when operating in a bypass mode, the sensing merged signal is not fetched in batches.

10. The method of claim 9,
    wherein selectively performing the second preset processing is performed according to the sensing merged signal and the first preset processing signal, respectively.

11. The method of claim 9, wherein a number of times the fetching the second sensor samples is performed during a first time interval is smaller than a number of times the generating the second sensor samples is performed during the first time interval.

12. The method of claim 11, wherein a number of times the receiving the first preset processing signal and the fetching the sensing merged signal during a second time interval is smaller than a number of times the fetching the second sensor samples during the second time interval.

13. The method of claim 12, wherein the number of times the fetching of the second sensor samples is performed during the first time interval is smaller than the number of times the generating of the second sensor samples is performed during the first time interval to reduce computed accumulated error and/or power consumption, and the number of times selectively receiving the first preset processing signal and fetching the sensing merged signal during the second time interval is smaller than the number of times the fetching of the second sensor samples is performed during the second time interval to reduce power consumption.

14. The method of claim 9, further comprising waking up to perform the fetching.

15. The method of claim 14, further comprising:
generating step counting information according to the first sensor samples; and
responsive to the step counting information reaching a predetermined number, using a notification signal to perform the waking up.

16. A method of motion processing of a mobile device having a first sensor, a second sensor, a microcontroller unit (MCU) and a central processing unit (CPU), the method comprising:
generating a plurality of sensor samples;
fetching the sensor samples;
performing a first preset processing according to the sensor samples;
storing the sensor samples and/or a result of the first preset processing in a buffer;
selectively performing a second preset processing, after fetching the result or receiving a signal based on the result, according to the sensor samples and the result;
wherein the result or the sensor samples are fetched in batches;
wherein, in generating the plurality of sensor samples, first sensor samples and second sensor samples are generated, with the second sensor samples being generated according to a first clock; and
merging, by the MCU, the first sensor samples and the second sensor samples to form a sensing merged signal;
wherein, when operating in a batch mode, the first preset processing signal and the sensing merged signal are respectively received and fetched in batches by the CPU according to a second clock different from the first clock to reduce power consumption; and
wherein, when operating in a bypass mode, the sensing merged signal is not fetched in batches.

17. The method of claim 16, further comprising:
selectively fetching the sensing merged signal; and
the performing the second preset processing is selectively performed according to the sensing merged signal and the first preset processing signal.

18. The method of claim 16, further comprising waking up to perform the fetching.

19. The method of claim 18, further comprising:
generating step counting information; and
responsive to the step counting information reaching a predetermined number, using a notification signal to perform the waking up.

* * * * *